United States Patent [19]

MacLaughlin

[11] Patent Number: 4,636,349

[45] Date of Patent: Jan. 13, 1987

[54] PROCESS FOR MANUFACTURING THERMOPLASTIC CONTAINERS

[75] Inventor: Don N. MacLaughlin, Midland, Mich.

[73] Assignee: Cosden Technology, Inc., Dallas, Tex.

[21] Appl. No.: 768,300

[22] Filed: Aug. 22, 1985

[51] Int. Cl.$^4$ .................. B29C 35/16; B29C 51/10; B29C 51/42
[52] U.S. Cl. ................................. 264/549; 264/28; 264/550; 425/384
[58] Field of Search .............. 264/28, 528, 549–551; 425/384

[56] References Cited

U.S. PATENT DOCUMENTS

| Re. 28,497 | 7/1975 | Gasmire | 264/28 |
| 3,482,281 | 12/1969 | Thiel | 425/384 |
| 3,488,413 | 1/1970 | Watts, Jr. | 264/550 |
| 4,191,039 | 3/1980 | Bradbury | 264/544 X |
| 4,234,536 | 11/1980 | Thiel et al. | 264/551 X |
| 4,508,670 | 4/1985 | Janke | 264/550 X |

FOREIGN PATENT DOCUMENTS 2547477  4/1977  Fed. Rep. of Germany ...... 264/550

Primary Examiner—Jan Silbaugh
Attorney, Agent, or Firm—Michael J. Caddell; M. Norwood Cheairs

[57] ABSTRACT

A process for forming hollow articles from a thermoplastic polymer sheet material. Polymer sheet material is heated to a forming temperature and clamp between a ported mold plug and a jacketed mold cavity. The mold plug is moved into the mold cavity to stretch the material into the cavity. The clamping is released during the moving of the plug and a substantial portion of the air trapped between the material and mold cavity is evacuated. Pressurized forming gas is injected through flow means around the mold plug to further expand the material into the mold cavity. Thereafter, the injecting of forming gas is discontinued and coolant is flowed through the jacketed mold cavity and a cooling fluid is injected through the ported mold plug against the material while the pressurized forming gas is simultaneously purged from the area between the mold plug and expanded material through the flow means.

9 Claims, 3 Drawing Figures

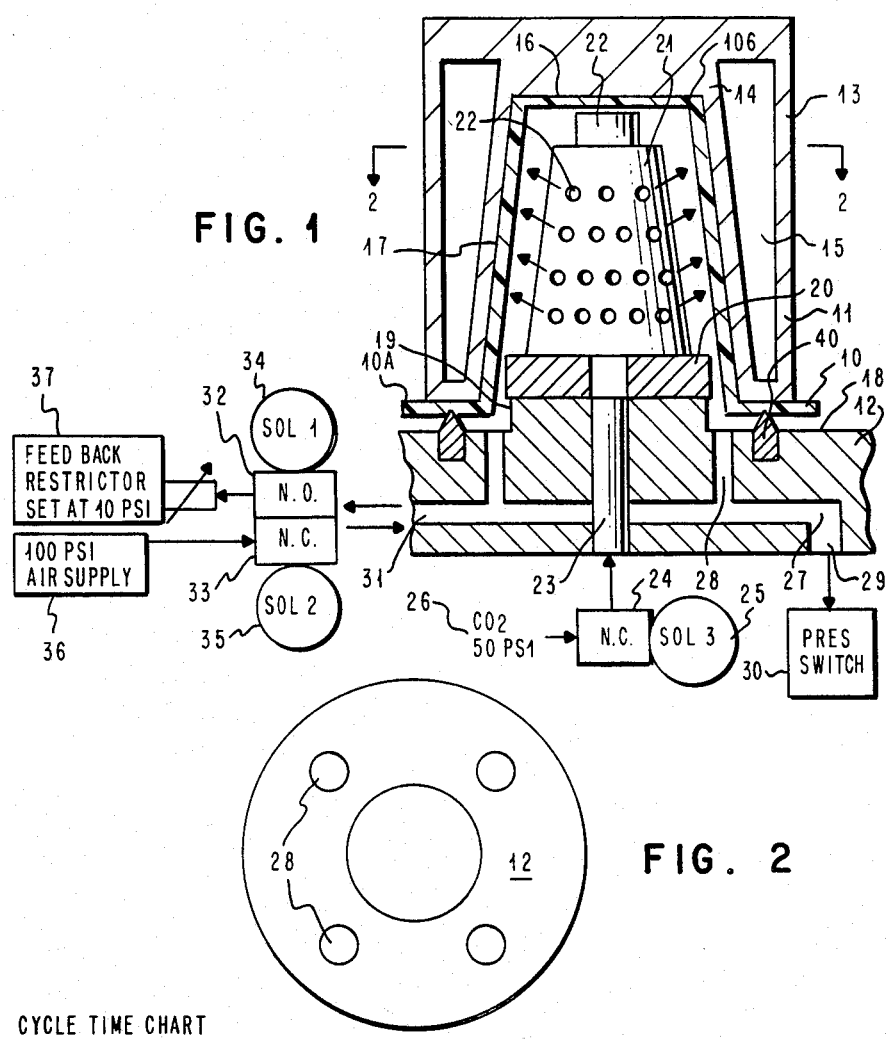
FIG. 1
FIG. 2
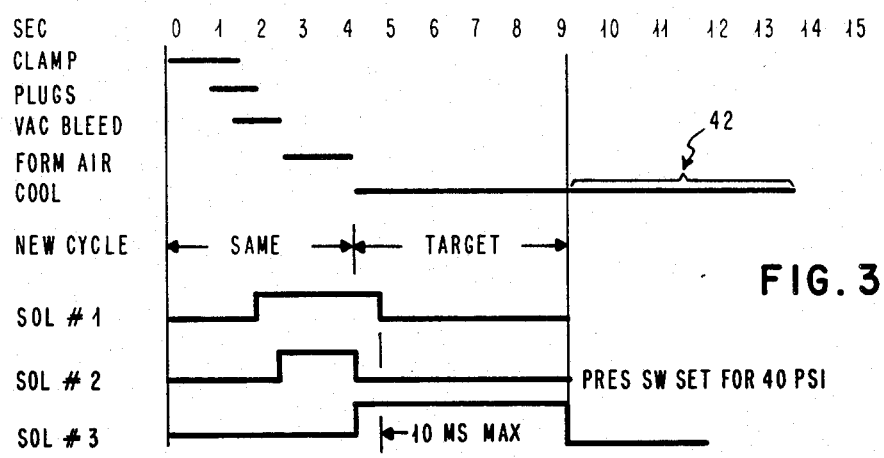

4,636,349

PROCESS FOR MANUFACTURING THERMOPLASTIC CONTAINERS

BACKGROUND OF THE INVENTION

The present invention relates generally to the manufacture of containers and more particularly involves a process and apparatus for thermoforming containers from thermoplastic polymers such as polypropylene.

In conventional thermoforming systems, one preferred method for forming containers involves the pressure/vacuum method of drawing heated thermoplastic sheet material into a mold and forming it against the mold wall by differential pressure.

It has been known that particular thermoplastics such as polypropylene have a comparatively long cooling cycle and therefore jacketed mold cavities having a liquid cooling capacity can speed up the thermoforming cycle. Such jacketed molding systems usually comprise a female mold cup having a double-walled construction allowing for the circulation of a coolant such as water around the exterior of the mold cup to speed up withdrawal of heat from the thermoformed container. Although jacketed mold cups have significantly reduced thermoforming times by speeding up the polymer cooling cycle, the cycle is still relatively long and a need has existed for means of shortening the cycle.

SUMMARY OF THE INVENTION

The present invention is an advancement over the art in that it provides greatly shortened cooling cycles in forming thermoplastics by differential-pressure thermoforming. The invention comprises process and apparatus for thermoforming polymers by utilizing a coolant such as $CO_2$ gas injected into the interior of the thermoformed part near the end of the forming cycle and overlapping the cooling cycle. The injected $CO_2$ gas serves as an additional coolant to the polymer, thereby cutting significant amounts of time from the required cooling cycle.

BRIEF DESCRIPTION OF THE DRAWINGS

FIG. 1 is a cross-sectional/schematic diagram of the apparatus of the invention;

FIG. 2 is a bottom schematic view of the mold apparatus; and,

FIG. 3 is a time diagram showing the timing cycles of the apparatus of FIGS. 1 and 2.

DESCRIPTION OF THE PREFERRED EMBODIMENT

Referring to FIG. 1, there is illustrated in schematic cross-sectional view a thermoforming apparatus embodying the principles of the present invention. The schematic illustration of FIG. 1 is typical of a single "station" of a thermoformer which is representative of the numerous such stations of the thermoformer. For example, one particular thermoformer utilizing the apparatus of this invention might have 48 different thermoforming stations, each very similar to the schematic illustration of FIG. 1. In FIG. 1, a sheet of thermoplastic material 10 is located transversely between an upper mold station 11 and lower mold station 12. The thermoplastic sheet 10 comprises a flat webbing area 10a and in this instance, an upper thermoformed container cup 10b still attached to webbing 10a. Upper mold station 11 comprises an outer jacket wall 13 concentrically displaced around an inner mold cup 14 such that an encapsulated "jacket" area 15 is formed surrounding the mold cup 14. Preferably, the cooling jacket cavity 15 encircles substantially the entire portion of the female mold section 14. The interior section of female mold 14 is configured in the desired shape for the container body 10b, and comprises an end wall 16 and a frustoconical side wall portion 17.

Lower mold station 12 comprises a platen or base plate 18 having an upwardly projecting mold base portion 19 upon which is fixedly attached a mold plug platform 20 having located thereon a male mold plug 21. Mold plug 21 has an upwardly projecting piston member 22 slidably located in the top portion thereof and resiliently biased upward. Male plug member 21 is preferably of a hollow construction and has a plurality of exhaust ports 22 passing through the wall thereof from the hollow portion to the area between the mold plug and the thermoplastic material. The inner cavity of male plug 21 communicates with an external source of $CO_2$ by means of a vertical flow passage 23 passing through members 20 and 19. Passage 23 is fluidically connected to a normally closed valve 24 containing an electrically actuated solnoid 25 for controlling the flow of $CO_2$ from the $CO_2$ pressure source 26.

A second set of fluid passages 27 is provided through base plate 12 to provide normal air pressurization for the thermoforming operation. Passage system 27 comprises a plurality of vertical passages 28 communicating with the interior of plastic container 10b and exteriorally to male plug member 21. Passage 27 has a communication passage 29 connected to pressure switch 30. A second passage 31 communicates with two valve assemblies 32 and 33 with valve 32 being a normally open valve actuated by solenoid 34, and valve 33 being a normally closed valve actuated by solenoid 35. Normally closed valve 33 regulates an air supply 36 comprising 100 psi pressurized air. Valve 32 communicates with a feedback restrictor 37 set at 10 psi. A clamp ring 40 is recessed into base plate 12 and comprises a generally circular ring having a ridged surface for impinging the web material 10a and preventing uneven drawing of the web into the container during the thermoforming operation.

FIG. 2 represents a schematic diagram generally taken at line 2—2 of FIG. 1 and illustrating the location of pressurized air passages 28 in base member 12. FIG. 2 is drawn with the male plug member removed for a clearer view of passages 28.

FIG. 3 represents a time graph illustrating the timing of the steps of the process of the present invention. The first line across the top of the graph of FIG. 3, is time in seconds. Each repeating line under the time line indicates the various steps of the inventive process. The length of the bar indicates the duration of that step as well as the beginning and end points of the step. For example, the very first step in the process is a clamping step beginning at point zero in time and running to approximately 1.5 seconds. Overlapping the clamping step is the plug movement step beginning at approximately 0.8 seconds and running to approximately 2 seconds, wherein the plug members begin upward movement into the mold cavities thereby stretching and orienting the thermoplastic material trapped between the male and female mold members. Step three is the vacuum bleed step overlapping the first two steps in which vacuum is drawn on the interior of the jacketed female member 14 through vacuum channels (not shown) to remove trapped air between the thermoplastic container portion 10b and the interior surface of female mold cup 14. Immediately after the vacuum bleed step, the forming air step is activated, beginning at approximately 2.5 seconds and running up slightly past 4 seconds, wherein compressed air is injected through passages 27 and 28 into the interior of container 10b to further force the heated thermoplastic material outward against the female mold cavity wall. Immediately at the end of the air forming cycle, the cooling cycle is initiated wherein contact of the thermoplastic material with the mold cavity wall begins a cooling of the thermoplastic because of the flow of cooling water injected through the cooling jacket cavity 15. At this point, it should be noted that FIG. 3 illustrates the conventional cooling cycle wherein coolant is supplied only through cooling jacket 15 according to conventional processes. It can be seen that this cooling cycle extends from 4 seconds to 14 seconds, thereby requiring a 10 second period for sufficient cooling utilizing solely the water cooling jacket 15.

Directly under the conventional cooling cycle line in FIG. 3 is a schematic representation entitled "new cycle" indicating the shortened cooling period achieved by the present invention. The new cycle utilizes the same steps up through the air forming step and the beginning of the cooling step. The portion of the cycle labeled "target" represents the entire cooling cycle portion utilizing the $CO_2$ in combination with the water jacket coolant. It can been seen that this represents a savings of 50% of the cooling cycle or 5 seconds in actual cooling time saved.

FIG. 3 also represents in the lower portion thereof, the timing of the three solenoids 1, 2, and 3, represented by reference numerals 34, 35, and 25, respectively. The upwardly stepped area of each line for the three solenoids represents the on period for each solenoid during the new cycle. For example, in solenoid 1, the step upwards is at 2 seconds and downward at approximately 5 seconds. The cycle time for solenoid 2 represents a turn-on at approximately 2.5 seconds and a turn-off at approximately 4 seconds. Solenoid 3, likewise, is turned on at approximately 4 seconds and off at 9 seconds indicating the end of the new cycle.

The time flow charts for the three solenoids can be interpreted by a close investigation of FIG. 1. Solenoid 1 is the first turned on and closes the 10 psi feed back restrictor. After this closing, solenoid 2 is actuated thereby opening valve 33 and allowing 100 psi air supply to enter channels 27 and 28, forming the container body 10b outward against the mold cavity wall 14. Immediately at the end of this forming operation solenoid 2 is deactivated and normally closed valve 33 is closed thereby shutting off air from the 100 psi air supply. Simultaneously, solenoid 3 is opened to admit chilled $CO_2$ through channel 23 and out exhaust ports 22 to the interior of the thermoplastic formed container body 10b. Shortly after the introduction of cooling gas into the interior of the thermoformed container 10b, the closed valve 32 is opened by deactivating solenoid 1 and allowing the feedback restrictor to enter the process. At this point, the pressure drops 10 psi inside the mold cavity and allows a flushing of the forming air out by the $CO_2$ which is held at 50 psi. The feedback restrictor also maintains a maximum air forming pressure of 40 psi during the air forming operation to prevent too rapid expansion of the heated thermoplastic material and/or a possible blow-out from a pressure surge. Likewise, the 10 psi restrictor creates a reverse flow action in the mold cavity back through the air forming ports. This results in a modulated purge of the cavity during the injection of $CO_2$.

Thus, it can be seen that the injection of $CO_2$ provides several beneficial advantages in the thermoforming operation. The primary advantage is the 50% reduction in the cooling time of the thermoforming process. This represents an overall reduction of approximately 35% in the total thermoforming time cycle. On a conventional molding line running a 48 cavity mold at a 13½ second cycle, approximately 71 million containers per year can be formed. On the other hand, utilizing the present invention, the same thermoforming line will produce over a 107 million containers per year merely by the addition of the $CO_2$ cooling step. The present invention is particularly advantageous for the thermoforming of resins which suffer from extreme cooling cycles and particularly advantageous in thermoforming polypropylene which has an extended cooling cycle. This reduction of cooling time and increased production greatly steps up the efficiency and lowers the cost per container in the thermoforming of large numbers of containers such as in the food and beverage industry. Thus, the present invention achieves approximately a 35% increase in the rate of thermoforming materials such as polypropylene into container bodies.

Although a specific preferred embodiment of the present invention has been described in the detailed description above, the description is not intended to limit the invention to the particular forms or embodiments disclosed therein since they are to be recognized as illustrative rather than restrictive, and it will be obvious to those skilled in the art that the invention is not so limited. For example, whereas polypropylene is cited as a material particularly advantageous to the present process and apparatus, other materials such as polyethylene and polyethylene terephthalate could also be used advantageously herein. Also whereas compressed $CO_2$ is shown as a coolant gas, it is clear that other inorganic gases such as nitrogen could be utilized advantageously. Thus the invention is declared to cover all changes and modifications of the specific example of the invention herein disclosed for purposes of illustration, which do not constitute departures from the spirit and scope of the invention.

The embodiments of the invention in which an exclusive property or privilege is claimed are defined as follows:

1. A process for forming hollow articles from a thermoplastic polymer sheet material, said process comprising:
    heating said polymer material to a forming temperature wherein said material is softened sufficiently to allow forming and yet prevent substantial flow of the material from gravity;
    clamping said heated material between a ported mold plug and a jacketed mold cavity;
    moving said mold plug into said mold cavity, thereby stretching said heated material into said cavity;
    releasing said clamping during said plug moving step and evacuating a substantial portion of the air trapped between said material and said mold cavity;
    injecting a pressurized forming gas such as compressed air through flow means around said mold plug to further expand said material substantially completely into said mold cavity; and, thereafter discontinuing said injecting step and flowing coolant through said jacketed mold cavity while injecting a cooling fluid through said ported mold plug against said heated material while simultaneously purging said pressurized gas from the area between said mold plug and said expanded material through said flow means.

2. The process of claim 1 wherein said coolant comprises a liquid having a high heat transfer characteristic, and said cooling fluid comprises a compressed gas which cools upon expansion into said mold cavity.

3. The process of claim 2 wherein said coolant liquid comprises water and said cooling fluid comprises carbon dioxide.

4. A process for thermoforming hollow articles from a thermoplastic polymer sheet material, said process comprising:
  heating said polymer sheet material to a forming temperature wherein said material is softened sufficiently to allow forming and yet prevent substantial flow of the material from gravity;
  clamping said heated sheet material between a ported mold plug and a jacketed mold cavity, wherein said ported mold plug has first flow means formed through a central plug member and second flow means formed through a base around said plug member;
  moving said mold plug into said mold cavity, thereby stretching said sheet material into said cavity;
  releasing said clamping during said plug moving step and communicating a vacuum source to the mold cavity for evacuating air trapped between said sheet material and said mold cavity;
  discontinuing said vacuum source and injecting a pressurized forming gas such as compressed air through said second flow means for a period sufficient to substantially fully expand said sheet material against said mold cavity;
  discontinuing said injecting step and simultaneously flowing a coolant through said jacketed mold cavity and injecting a cooling fluid through said first flow means while purging said forming gas outward through said second flow means.

5. The process of claim 4 wherein a pressurized forming gas is supplied to said second flow means at around 100 PSI during said injecting step.

6. The process of claim 4 wherein a pressurized forming gas is supplied to said second flow means at around 100 PSI during said injecting step, is shut off therefrom at the end of said injecting step and the pressure removed from said second flow means, and said cooling fluid is supplied to said first flow means at around 50 PSI.

7. The process of claim 6 wherein a back pressure of about 10 PSI is maintained on said second flow means during said coolant flowing step.

8. The process of claim 4 wherein a pressurized forming gas is supplied to said second flow means at around 100 PSI during said injecting step and the pressure thereof is at least partially relieved at the end of said injecting step, and said cooling fluid is supplied to the interior of said formed sheet material through said first flow means at a pressure of about 40 PSI over the partially relieved pressure in said second flow means.

9. The process of claim 8 wherein a pressure drop of around 10 PSI is maintained in said second flow means after said injecting step.

* * * * *